United States Patent
Soltani et al.

(10) Patent No.: US 9,504,620 B2
(45) Date of Patent: Nov. 29, 2016

(54) METHOD OF CONTROLLING A PRESSURIZED MATTRESS SYSTEM FOR A SUPPORT STRUCTURE

(71) Applicant: American Sterilizer Company, Mentor, OH (US)

(72) Inventors: Sohrab Soltani, Charleston, SC (US); Steven J Doehler, Cincinnati, OH (US); James H Price, Mount Pleasant, SC (US); Robert J Rajewski, Saline, MI (US); Christopher D Labedz, Streetsboro, OH (US)

(73) Assignee: AMERICAN STERILIZER COMPANY, Mentor, OH (US)

( * ) Notice: Subject to any disclaimer, the term of this patent is extended or adjusted under 35 U.S.C. 154(b) by 378 days.

(21) Appl. No.: 14/338,369

(22) Filed: Jul. 23, 2014

(65) Prior Publication Data

US 2016/0022519 A1    Jan. 28, 2016

(51) Int. Cl.
*A61G 7/057* (2006.01)
*A61G 7/018* (2006.01)
*G01L 7/02* (2006.01)
*G01L 19/00* (2006.01)
*A61G 7/015* (2006.01)
*A61G 13/06* (2006.01)

(52) U.S. Cl.
CPC ........... *A61G 7/05769* (2013.01); *A61G 7/018* (2013.01); *G01L 7/02* (2013.01); *G01L 19/0007* (2013.01); *A61G 7/015* (2013.01); *A61G 13/06* (2013.01); *A61G 2203/34* (2013.01)

(58) Field of Classification Search
CPC ...... A61G 7/015; A61G 7/018; A61G 7/057; A61G 7/05769; A61G 7/05776
See application file for complete search history.

(56) References Cited

U.S. PATENT DOCUMENTS

| | | | |
|---|---|---|---|
| 371,938 A | 10/1887 | Hinsdill | 5/722 |
| 1,835,212 A | 12/1931 | Fowler | 5/721 |
| 2,029,370 A | 2/1936 | Heldenbrand | 5/655.7 |
| 2,462,984 A | 3/1949 | Maddison | 5/423 |
| 2,493,067 A | 1/1950 | Goldsmith | 5/726 |
| 2,742,652 A | 4/1956 | Mautz | 5/652 |
| 2,901,756 A | 9/1959 | Moule | 5/698 |
| 3,000,020 A | 9/1961 | Lombard et al. | 5/653 |
| 3,030,145 A | 4/1962 | Kottemann | 297/180.11 |
| 3,047,888 A | 8/1962 | Shecter et al. | 428/218 |
| 3,080,578 A | 3/1963 | Novascone | 5/720 |
| 3,230,556 A | 1/1966 | Shippee | 5/423 |
| 3,268,922 A | 8/1966 | Moxley | 5/420 |
| 3,421,163 A | 1/1969 | Stoughton | 297/452.41 |
| 3,565,195 A | 2/1971 | Miller et al. | 177/210 R |
| 3,580,615 A | 5/1971 | Prosser | 285/81 |
| 3,605,145 A | 9/1971 | Graebe | 5/706 |
| 3,644,950 A | 2/1972 | Lindsay, Jr. | 5/709 |

(Continued)

*Primary Examiner* — Peter M Cuomo
*Assistant Examiner* — Ifeolu Adeboyejo
(74) *Attorney, Agent, or Firm* — Kusner & Jaffe; Michael A. Centanni

(57) ABSTRACT

A method for automatically varying the internal air pressure in at least one inflatable air bladder associated with at least one zone of a pressurized mattress system to achieve an optimal zone air pressure for a patient. The method includes a step of incrementally decreasing the zone air pressure of the at least one zone until more than a predetermined percentage or portion of the patient is directly supported by a substrate disposed below the at least one inflatable air bladder. The method then determines the appropriate increase in zone air pressure to achieve the optimal zone air pressure for the patient.

14 Claims, 5 Drawing Sheets

(56) References Cited

U.S. PATENT DOCUMENTS

| | | | |
|---|---|---|---|
| 3,826,926 A | 7/1974 | White et al. ................. 377/57 |
| 3,875,481 A | 4/1975 | Miller et al. .............. 361/283.1 |
| 3,939,508 A | 2/1976 | Hall et al. ..................... 5/727 |
| 3,974,532 A | 8/1976 | Ecchuya ........................ 5/724 |
| 4,005,438 A | 1/1977 | Meltzer et al. ............. 347/121 |
| 4,111,058 A | 9/1978 | Gross ............................ 73/714 |
| 4,266,263 A | 5/1981 | Haberl et al. ............ 361/283.2 |
| 4,347,633 A | 9/1982 | Gammons et al. ............ 5/713 |
| 4,370,697 A | 1/1983 | Haberl et al. ............ 361/283.1 |
| 4,449,261 A | 5/1984 | Magnusson .................... 5/722 |
| 4,485,505 A | 12/1984 | Paul ............................... 5/714 |
| 4,486,909 A | 12/1984 | McKneelan ................... 5/669 |
| 4,494,775 A | 1/1985 | Nash et al. ..................... 285/26 |
| 4,522,447 A | 6/1985 | Snyder et al. ............ 297/452.27 |
| 4,555,130 A | 11/1985 | McClain ........................ 285/26 |
| 4,580,301 A | 4/1986 | Ludman et al. ................ 5/724 |
| 4,584,625 A | 4/1986 | Kellogg ..................... 361/283.1 |
| 4,631,221 A | 12/1986 | Disselbeck et al. ........... 428/166 |
| 4,638,519 A | 1/1987 | Hess ............................... 5/713 |
| 4,665,440 A | 5/1987 | Tromborg ..................... 348/316 |
| 4,706,313 A | 11/1987 | Murphy .......................... 5/722 |
| 4,753,480 A | 6/1988 | Morell ...................... 297/452.27 |
| 4,777,681 A | 10/1988 | Luck et al. .................... 5/655.9 |
| 4,788,730 A | 12/1988 | Bexton ........................... 5/676 |
| 4,796,948 A | 1/1989 | Paul et al. ................. 297/284.1 |
| 4,803,744 A | 2/1989 | Peck et al. ...................... 5/713 |
| 4,825,488 A | 5/1989 | Bedford ........................... 5/726 |
| 4,856,993 A | 8/1989 | Maness et al. .................. 433/68 |
| 4,890,877 A | 1/1990 | Ashtiani-Zarandi et al. |
| 4,896,389 A | 1/1990 | Chamberland ................. 5/710 |
| 4,900,065 A | 2/1990 | Houck ............................ 285/73 |
| 4,930,173 A | 6/1990 | Woller ..................... 297/452.48 |
| 4,947,500 A | 8/1990 | Seiler ............................. 5/713 |
| 4,949,412 A | 8/1990 | Goode ............................ 5/713 |
| 4,949,414 A | 8/1990 | Thomas et al. .................. 5/713 |
| 4,951,334 A | 8/1990 | Maier .............................. 5/653 |
| 4,986,136 A | 1/1991 | Brunner et al. .......... 73/862.046 |
| 5,002,336 A | 3/1991 | Feher ....................... 297/180.13 |
| 5,010,772 A | 4/1991 | Bourland et al. ........ 73/862.046 |
| 5,010,774 A | 4/1991 | Kikuo et al. ............ 73/862.046 |
| 5,029,352 A | 7/1991 | Hargest et al. .................. 5/689 |
| 5,039,567 A | 8/1991 | Landi et al. ................... 428/116 |
| 5,051,673 A | 9/1991 | Goodwin ...................... 318/481 |
| 5,085,487 A | 2/1992 | Weingartner et al. ...... 297/452.1 |
| 5,086,652 A | 2/1992 | Kropp ............................ 73/767 |
| 5,088,747 A | 2/1992 | Morrison et al. ........... 297/219.1 |
| 5,107,558 A | 4/1992 | Luck ............................... 5/727 |
| 5,111,544 A | 5/1992 | Graebe ............................ 5/654 |
| 5,121,513 A | 6/1992 | Thomas et al. .................. 5/713 |
| 5,182,826 A | 2/1993 | Thomas et al. .................. 5/713 |
| 5,191,664 A | 3/1993 | Wyatt ............................. 5/498 |
| 5,201,780 A | 4/1993 | Dinsmoor, III et al. ......... 5/679 |
| 5,231,717 A | 8/1993 | Scott et al. ...................... 5/727 |
| 5,237,879 A | 8/1993 | Speeter .................... 73/862.041 |
| 5,243,722 A | 9/1993 | Gusakov ....................... 5/655.3 |
| 5,243,723 A | 9/1993 | Cotner et al. ................... 5/710 |
| 5,255,404 A | 10/1993 | Dinsmoor, III et al. ......... 5/677 |
| 5,259,079 A | 11/1993 | Visser et al. .................... 5/685 |
| 5,267,364 A | 12/1993 | Volk ............................... 5/713 |
| 5,269,030 A | 12/1993 | Pahno et al. .................... 5/604 |
| 5,294,181 A | 3/1994 | Rose et al. ................ 297/452.25 |
| 5,306,912 A | 4/1994 | Sibbald et al. ............... 250/334 |
| 5,311,623 A | 5/1994 | Hendi ............................. 5/685 |
| 5,323,500 A | 6/1994 | Roe et al. ....................... 5/710 |
| 5,325,551 A | 7/1994 | Tappel et al. ................... 5/709 |
| 5,364,686 A | 11/1994 | Disselbeck et al. ........... 428/174 |
| 5,369,434 A | 11/1994 | Kawamoto et al. .......... 348/315 |
| 5,373,595 A | 12/1994 | Johnson et al. ................. 5/710 |
| 5,375,273 A | 12/1994 | Bodine, Jr. et al. ............. 5/710 |
| 5,394,576 A | 3/1995 | Soltani et al. ................... 5/709 |
| 5,401,922 A | 3/1995 | Asta ............................ 200/5 A |
| 5,403,065 A | 4/1995 | Callerio .................... 297/180.11 |
| 5,430,901 A | 7/1995 | Farley ............................. 5/730 |
| 5,442,823 A | 8/1995 | Siekman et al. ................ 5/653 |
| 5,447,076 A | 9/1995 | Ziegler ..................... 73/862.626 |
| 5,454,142 A | 10/1995 | Neely et al. ................... 28/104 |
| 5,457,833 A | 10/1995 | Jay .................................. 5/654 |
| 5,473,783 A | 12/1995 | Allen ............................ 5/652.2 |
| 5,483,709 A | 1/1996 | Foster et al. ................. 5/81.1 R |
| 5,505,072 A | 4/1996 | Oreper .......................... 73/1.59 |
| 5,513,402 A | 5/1996 | Schwartz ........................ 5/691 |
| 5,513,899 A | 5/1996 | Michaels et al. ......... 297/452.41 |
| 5,514,832 A | 5/1996 | Dusablon et al. ............ 174/15.1 |
| 5,515,040 A | 5/1996 | Lee et al. ................. 340/870.04 |
| 5,539,942 A * | 7/1996 | Melou ............... A61G 7/05776 |
| | | 5/655.3 |
| 5,542,136 A | 8/1996 | Tappel ............................ 5/710 |
| 5,566,409 A | 10/1996 | Klearman ....................... 5/723 |
| 5,586,346 A | 12/1996 | Stacy et al. ..................... 5/710 |
| 5,588,167 A | 12/1996 | Pahno et al. .................... 5/606 |
| 5,592,707 A | 1/1997 | Dinsmoor, III et al. ......... 5/654 |
| 5,594,963 A | 1/1997 | Berkowitz ...................... 5/713 |
| 5,606,764 A | 3/1997 | Zhou et al. ................ 15/250.16 |
| 5,611,096 A | 3/1997 | Bartlett et al. .................. 5/617 |
| 5,623,736 A | 4/1997 | Soltani et al. ................... 5/689 |
| 5,636,395 A | 6/1997 | Serda .............................. 5/691 |
| 5,636,397 A | 6/1997 | Boyd et al. ..................... 5/739 |
| 5,638,564 A | 6/1997 | Greenawalt et al. ............ 5/636 |
| 5,647,079 A | 7/1997 | Hakamiun et al. .............. 5/713 |
| 5,653,939 A | 8/1997 | Hollis et al. .................... 506/3 |
| 5,662,384 A | 9/1997 | O'Neill et al. .......... 297/452.41 |
| 5,666,681 A | 9/1997 | Meyer et al. ................... 5/727 |
| 5,671,977 A | 9/1997 | Jay et al. .................. 297/452.24 |
| 5,675,855 A | 10/1997 | Culp ............................... 5/709 |
| 5,678,265 A | 10/1997 | Meyer ............................. 5/654 |
| 5,678,891 A | 10/1997 | O'Neill et al. ............ 297/284.6 |
| 5,680,662 A | 10/1997 | Purdy et al. ..................... 5/676 |
| 5,681,092 A | 10/1997 | Hanson et al. .......... 297/452.41 |
| 5,687,436 A | 11/1997 | Denton ........................... 5/653 |
| 5,687,438 A | 11/1997 | Biggie et al. ................... 5/654 |
| 5,689,845 A | 11/1997 | Sobieralski ..................... 5/654 |
| 5,693,886 A | 12/1997 | Seimiya et al. ................ 73/718 |
| 5,729,853 A | 3/1998 | Thompson ...................... 5/713 |
| 5,731,062 A | 3/1998 | Kim et al. .................... 428/175 |
| 5,736,656 A | 4/1998 | Fullen et al. ................. 73/865.4 |
| 5,756,904 A | 5/1998 | Oreper et al. ........... 73/862.046 |
| 5,781,949 A | 7/1998 | Weismiller et al. ............. 5/715 |
| 5,802,646 A | 9/1998 | Stolpmann et al. ............. 5/740 |
| 5,815,865 A | 10/1998 | Washburn et al. .............. 5/713 |
| 5,833,321 A | 11/1998 | Kim et al. ................. 297/452.42 |
| 5,851,930 A | 12/1998 | Bessey et al. ................. 422/60 |
| 5,855,415 A | 1/1999 | Lilley, Jr. ................. 297/452.27 |
| 5,865,474 A | 2/1999 | Takahashi ................... 285/124.1 |
| 5,870,785 A | 2/1999 | Hoorens ....................... 5/652.1 |
| 5,882,322 A | 3/1999 | Kim et al. ........................ 602/6 |
| 5,896,680 A | 4/1999 | Kim et al. ........................ 36/28 |
| 5,904,172 A | 5/1999 | Gifft et al. .................... 137/224 |
| 5,905,209 A | 5/1999 | Oreper ..................... 73/862.045 |
| 5,914,465 A | 6/1999 | Allen et al. ................ 178/18.06 |
| 5,920,934 A | 7/1999 | Hannagan et al. .............. 5/713 |
| 5,926,884 A | 7/1999 | Biggie et al. ................... 5/714 |
| 5,966,762 A | 10/1999 | Wu ................................ 5/710 |
| 5,966,763 A | 10/1999 | Thomas et al. ................. 5/715 |
| 5,972,477 A | 10/1999 | Kim et al. .................... 428/175 |
| 6,007,898 A | 12/1999 | Kim et al. .................... 428/175 |
| 6,014,783 A | 1/2000 | Collier et al. ................... 5/618 |
| 6,052,851 A | 4/2000 | Kohnle ........................... 5/690 |
| 6,052,853 A | 4/2000 | Schmid .......................... 5/726 |
| 6,061,855 A | 5/2000 | Flick .............................. 5/713 |
| 6,226,271 B1 | 5/2001 | Dent ............................ 370/252 |
| 6,234,006 B1 | 5/2001 | Sunshine et al. ............. 73/29.01 |
| 6,269,504 B1 | 8/2001 | Romano et al. ................ 5/690 |
| 6,286,167 B1 | 9/2001 | Stolpmann ...................... 5/737 |
| 6,354,999 B1 | 3/2002 | Dgany et al. ................. 600/486 |
| 6,370,718 B1 | 4/2002 | Schmid .......................... 5/726 |
| 6,374,681 B1 | 4/2002 | Vanuytven ............... 73/862.046 |
| 6,415,814 B1 | 7/2002 | Hand et al. ................. 137/487.5 |
| 6,487,739 B1 | 12/2002 | Harker ............................ 5/726 |
| 6,534,985 B2 | 3/2003 | Holladay, III et al. ....... 324/334 |
| 6,633,656 B1 | 10/2003 | Picard .......................... 382/124 |
| 6,687,937 B2 | 2/2004 | Harker ............................ 5/726 |
| 6,701,556 B2 | 3/2004 | Romano et al. ................ 5/653 |
| 6,707,449 B2 | 3/2004 | Hinckley et al. ............. 345/173 |
| 6,750,852 B2 | 6/2004 | Gillespie et al. ............. 345/173 |

(56) References Cited

U.S. PATENT DOCUMENTS

| | | |
|---|---|---|
| 6,782,574 B2 | 8/2004 | Totton et al. ............... 5/713 |
| 6,803,906 B1 | 10/2004 | Morrison .................. 345/173 |
| 6,826,968 B2 | 12/2004 | Manaresi et al. ........ 73/862.046 |
| 6,885,400 B1 | 4/2005 | Vodanovic .................. 348/311 |
| 6,964,205 B2 | 11/2005 | Papakostas et al. ..... 73/862.046 |
| 6,972,401 B2 | 12/2005 | Akitt et al. ............... 250/221 |
| 6,985,779 B2 | 1/2006 | Hsiung et al. .............. 700/19 |
| 7,067,979 B2 | 6/2006 | Sakamoto .................. 313/584 |
| 7,191,480 B2 | 3/2007 | Romano et al. ............. 5/690 |
| 7,191,482 B2 | 3/2007 | Romano et al. ............. 5/714 |
| 7,290,300 B1 | 11/2007 | Khambete ................. 5/423 |
| 7,296,315 B2 | 11/2007 | Totton et al. ............... 5/737 |
| 7,339,580 B2 | 3/2008 | Westerman et al. ........ 345/173 |
| 7,469,432 B2 | 12/2008 | Chambers .................. 5/423 |
| 7,469,436 B2 | 12/2008 | Meyer et al. ............... 5/727 |
| 7,480,950 B2 | 1/2009 | Feher ....................... 5/423 |
| 7,480,953 B2 | 1/2009 | Romano et al. ............. 5/714 |
| 7,580,030 B2 | 8/2009 | Marten ..................... 345/173 |
| 7,609,178 B2 | 10/2009 | Son et al. .................. 341/33 |
| 7,617,555 B2 | 11/2009 | Romano et al. ............. 5/714 |
| 7,638,350 B2 | 12/2009 | Deconde et al. ............ 483/53 |
| 7,657,956 B2 | 2/2010 | Stacy et al. ............... 5/713 |
| 7,698,765 B2 | 4/2010 | Bobey et al. ............... 5/713 |
| 7,712,164 B2 | 5/2010 | Chambers .................. 5/423 |
| 7,914,611 B2 | 3/2011 | Vrzalik et al. ............. 96/11 |
| 7,937,789 B2 | 5/2011 | Feher ....................... 5/423 |
| 7,937,791 B2 | 5/2011 | Meyer et al. ............... 5/727 |
| 7,966,680 B2 | 6/2011 | Romano et al. ............. 5/713 |
| 8,108,957 B2 | 2/2012 | Richards et al. ............ 5/600 |
| 8,118,920 B2 | 2/2012 | Vrzalik et al. ............. 96/11 |
| 8,146,191 B2 | 4/2012 | Bobey et al. ............... 5/713 |
| 8,191,187 B2 | 6/2012 | Brykalski et al. ............. 5/423 |
| 8,332,975 B2 | 12/2012 | Brykalski et al. ............. 5/421 |
| 8,372,182 B2 | 2/2013 | Vrzalik et al. .............. 96/111 |
| 2002/0073489 A1 | 6/2002 | Totton et al. ............... 5/713 |
| 2002/0128572 A1* | 9/2002 | Chang .............. A47C 21/006 601/148 |
| 2002/0195144 A1 | 12/2002 | Hand et al. ............... 137/487.5 |
| 2003/0046762 A1 | 3/2003 | Stolpmann .................. 5/421 |
| 2004/0133092 A1 | 7/2004 | Kain ........................ 600/377 |
| 2004/0237203 A1 | 12/2004 | Romano et al. ............. 5/713 |
| 2005/0021244 A1 | 1/2005 | Nicoli et al. ............... 702/29 |
| 2005/0022308 A1 | 2/2005 | Totton et al. ............... 5/713 |
| 2005/0029453 A1 | 2/2005 | Allen et al. ................. 250/332 |
| 2005/0068041 A1 | 3/2005 | Kress et al. ................ 324/527 |
| 2005/0128082 A1 | 6/2005 | Stanley et al. .............. 340/561 |
| 2005/0172405 A1* | 8/2005 | Menkedick .......... A61B 5/1115 5/618 |
| 2005/0273940 A1* | 12/2005 | Petrosenko ......... A61B 5/1126 5/722 |
| 2005/0287974 A1 | 12/2005 | Zhou ..................... 455/226.2 |
| 2006/0007172 A1 | 1/2006 | Baker et al. ............... 345/173 |
| 2006/0075559 A1* | 4/2006 | Skinner ............. A61G 7/05769 5/615 |
| 2006/0077182 A1 | 4/2006 | Studt ..................... 345/173 |
| 2006/0080778 A1 | 4/2006 | Chambers .................. 5/652.2 |
| 2006/0112489 A1* | 6/2006 | Bobey ................ A61B 5/1115 5/655.3 |
| 2006/0137099 A1 | 6/2006 | Feher ..................... 5/713 |
| 2006/0168736 A1* | 8/2006 | Meyer ............... A61G 7/05715 5/727 |
| 2007/0086757 A1 | 4/2007 | Feher ...................... 392/297 |
| 2007/0113681 A1 | 5/2007 | Nishimura et al. ...... 73/862.046 |
| 2007/0163052 A1 | 7/2007 | Romano et al. ............. 5/713 |
| 2007/0180625 A1* | 8/2007 | Walke ................ A61G 7/0504 5/706 |
| 2007/0234481 A1 | 10/2007 | Totton et al. ............... 5/714 |
| 2007/0235036 A1 | 10/2007 | Bobey et al. ............... 128/845 |
| 2007/0261548 A1 | 11/2007 | Vrzalik et al. .............. 95/52 |
| 2007/0266499 A1* | 11/2007 | O'Keefe ............. A61G 7/015 5/713 |
| 2008/0028533 A1* | 2/2008 | Stacy ................ A61G 7/015 5/713 |
| 2008/0180390 A1 | 7/2008 | Yoshikawa ................. 345/156 |
| 2008/0263776 A1 | 10/2008 | O'Reagan et al. ............ 5/714 |
| 2008/0282471 A1* | 11/2008 | Chambers .......... A61G 7/05769 5/616 |
| 2009/0013470 A1* | 1/2009 | Richards ............ A61G 7/05715 5/613 |
| 2009/0093912 A1* | 4/2009 | Wilker, Jr. .......... A61G 7/05776 700/282 |
| 2009/0106906 A1* | 4/2009 | Soltani ............... A61G 7/0755 5/713 |
| 2009/0106907 A1 | 4/2009 | Chambers .................. 5/714 |
| 2009/0119846 A1 | 5/2009 | Meyer et al. ............... 5/709 |
| 2009/0126110 A1 | 5/2009 | Feher ...................... 5/423 |
| 2009/0133194 A1 | 5/2009 | Romano et al. ............. 5/714 |
| 2009/0144909 A1* | 6/2009 | Skinner ............. A61G 7/05776 5/713 |
| 2009/0183312 A1 | 7/2009 | Price et al. ................. 5/706 |
| 2009/0217460 A1* | 9/2009 | Bobey ................ A61G 7/00 5/709 |
| 2009/0237264 A1* | 9/2009 | Bobey ............... A61G 7/05776 340/815.69 |
| 2010/0043143 A1 | 2/2010 | O'Reagan et al. ............ 5/421 |
| 2010/0063638 A1* | 3/2010 | Skinner ............. A61G 7/05769 700/281 |
| 2010/0095461 A1 | 4/2010 | Romano et al. ............. 5/710 |
| 2010/0095462 A1 | 4/2010 | Bobey et al. ............... 5/713 |
| 2010/0101022 A1* | 4/2010 | Riley ................. A61B 5/0816 5/600 |
| 2010/0132116 A1 | 6/2010 | Stacy et al. ............... 5/423 |
| 2011/0107514 A1 | 5/2011 | Brykalski et al. ............. 5/421 |
| 2011/0113561 A1* | 5/2011 | Douglas ............. A61G 7/05769 5/713 |
| 2011/0209289 A1 | 9/2011 | Meyer et al. ............... 5/699 |
| 2011/0219548 A1 | 9/2011 | Vrzalik et al. .............. 5/699 |
| 2011/0258778 A1 | 10/2011 | Brykalski et al. ............. 5/421 |
| 2011/0258782 A1* | 10/2011 | Call .................. A47C 7/021 5/655.3 |
| 2011/0289685 A1 | 12/2011 | Romano et al. ............. 5/423 |
| 2011/0302720 A1 | 12/2011 | Yakam et al. ............... 5/710 |
| 2012/0144584 A1 | 6/2012 | Vrzalik et al. .............. 5/600 |
| 2013/0145558 A1* | 6/2013 | Bhai .................. A61G 7/015 5/710 |
| 2013/0198954 A1 | 8/2013 | Brykalski et al. ............. 5/421 |
| 2014/0196210 A1* | 7/2014 | Lachenbruch ........ A61G 7/001 5/423 |
| 2014/0305445 A1* | 10/2014 | Morimura .......... A61G 7/05776 128/889 |
| 2015/0182400 A1* | 7/2015 | Meyer ................ A61G 7/018 5/710 |

\* cited by examiner

METHOD OF CONTROLLING A PRESSURIZED MATTRESS SYSTEM FOR A SUPPORT STRUCTURE

FIELD OF THE INVENTION

The present invention relates generally to support structures for supporting patients, and more particularly, to a pressurized mattress system for use on a support structure.

BACKGROUND OF THE INVENTION

Patients are sometimes placed on support structures, e.g., beds, operating room tables, examination tables, etc., for extended periods of time. However, the longer the patient remains on the support structure, the greater the likelihood that the patient will become uncomfortable. Moreover, it is believed that stationary patients are at an increased risk of decreased blood circulation that may lead to the development of pressure ulcers or nerve damage.

In the past, medical personnel were required to move the patient frequently in order to help make the patient comfortable and to aid in maintaining adequate blood circulation. Recently, the use of pressurized mattress systems has shown to aid medical personnel in accomplishing the aforementioned goals. In general, a pressurized mattress system includes a mattress having a plurality of inflatable air bladders. The pressure of the air in the plurality of inflatable air bladders is adjustable to allow a user to vary the firmness of the mattress.

The present invention addresses the foregoing issues and provides a pressurized mattress system that includes a controller for monitoring the pressure at an interface between a patient and the pressurized mattress system (hereinafter referred to as an "interface pressure") and automatically adjusting the pressure in the plurality of inflatable air bladders.

SUMMARY OF THE INVENTION

In accordance with the present invention, there is provided a method for controlling a pressurized mattress system. The pressurized mattress system has an upper surface for receiving a patient thereon. The pressurized mattress system includes at least one zone having at least one inflatable air bladder. A substrate is disposed below the at least one inflatable air bladder. A pressure sensor measures a zone air pressure of the at least one zone. A plurality of interface pressure sensors is disposed on an upper surface of the at least one inflatable air bladder. Each of the plurality of interface pressure sensors measures an interface pressure at a discrete location along the upper surface of the at least one inflatable air bladder. A source of pressurized air is provided. A controller receives signals from the pressure sensor and the plurality of interface pressure sensors and controls the flow of pressurized air to/from the at least one inflatable air bladder based on the signals. The controller calculates a zone interface pressure for the at least one zone based on the signals from the plurality of interface pressure sensors. The method includes the steps of:

a) inflating the at least one inflatable air bladder to an initial zone air pressure;
b) reducing the zone air pressure by a predetermined first value and calculating a zone interface pressure;
c) repeating step b) until the zone interface pressure meets a predetermined criterion and storing the zone air pressure as a bottoming point zone air pressure; and
d) pressurizing the at least one zone to an optimal zone air pressure based on the bottoming point zone air pressure.

In accordance with another aspect of the present invention, there is provided a method for controlling a pressurized mattress system. The pressurized mattress system has an upper surface for receiving a patient thereon. The pressurized mattress system includes at least one zone having at least one inflatable air bladder. A pressure sensor measures a zone air pressure of the at least one zone. A plurality of interface pressure sensors is disposed on an upper surface of the at least one inflatable air bladder. Each of the plurality of interface pressure sensors measures an interface pressure at a discrete location along the upper surface of the at least one inflatable air bladder. A source of pressurized air is provided. A controller receives signals from the pressure sensor and the plurality of interface pressure sensors and controls the flow of pressurized air to/from the at least one inflatable air bladder based on the signals. The controller calculates a zone interface pressure for the at least one zone based on the signals from the plurality of interface pressure sensors. The method includes the steps of:

a) inflating the at least one inflatable air bladder to an initial zone air pressure;
b) calculating a zone interface pressure and storing as a first zone interface pressure;
c) reducing the zone air pressure by a predetermined first value;
d) calculating a zone interface pressure and storing as a second zone interface pressure;
e) repeating steps b)-d) until the second zone interface pressure exceeds the first zone interface pressure by a predetermined amount;
f) storing the second zone air pressure as a zone air pressure at a bottoming point;
g) increasing the zone air pressure by a predetermined second value;
h) calculating a zone interface pressure and storing as a third zone interface pressure; and
i) comparing the third zone interface pressure to the first zone interface pressure and inflating the at least one zone to the zone air pressure associated with the lower zone interface pressure.

An advantage of the present invention is a support structure that includes a pressurized mattress system for adjusting the air pressure in a plurality of inflatable air bladders disposed below a patient.

Another advantage of the present invention is a support structure as described above having a plurality of interface pressure sensors disposed on a plurality of inflatable air bladders for measuring interface pressures between the patient and a top surface of the pressurized mattress system.

Another advantage of the present invention is a support structure as described above having a controller for automatically varying a zone air pressure in the plurality of inflatable air bladders.

Another advantage of the present invention is a support structure as described above having a mode that assists a user in transferring a patient to/from the support structure.

Another advantage of the present invention is a support structure as described above having a mode that assists a user in performing cardiopulmonary resuscitation (CPR) on a patient.

Yet another advantage of the present invention is a support structure as described above having a mode wherein the temperature of the pressurized mattress system can be controlled by a user.

Still yet another advantage of the present invention is a support structure having a pressurized mattress system that provides a pressure mapping of the interface pressures between a patient and a surface of the pressurized mattress system.

Another advantage of the present invention is a support structure having a pressurized mattress system that does not require user input to control the interface pressure between a patient and a surface of the pressurized mattress system.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
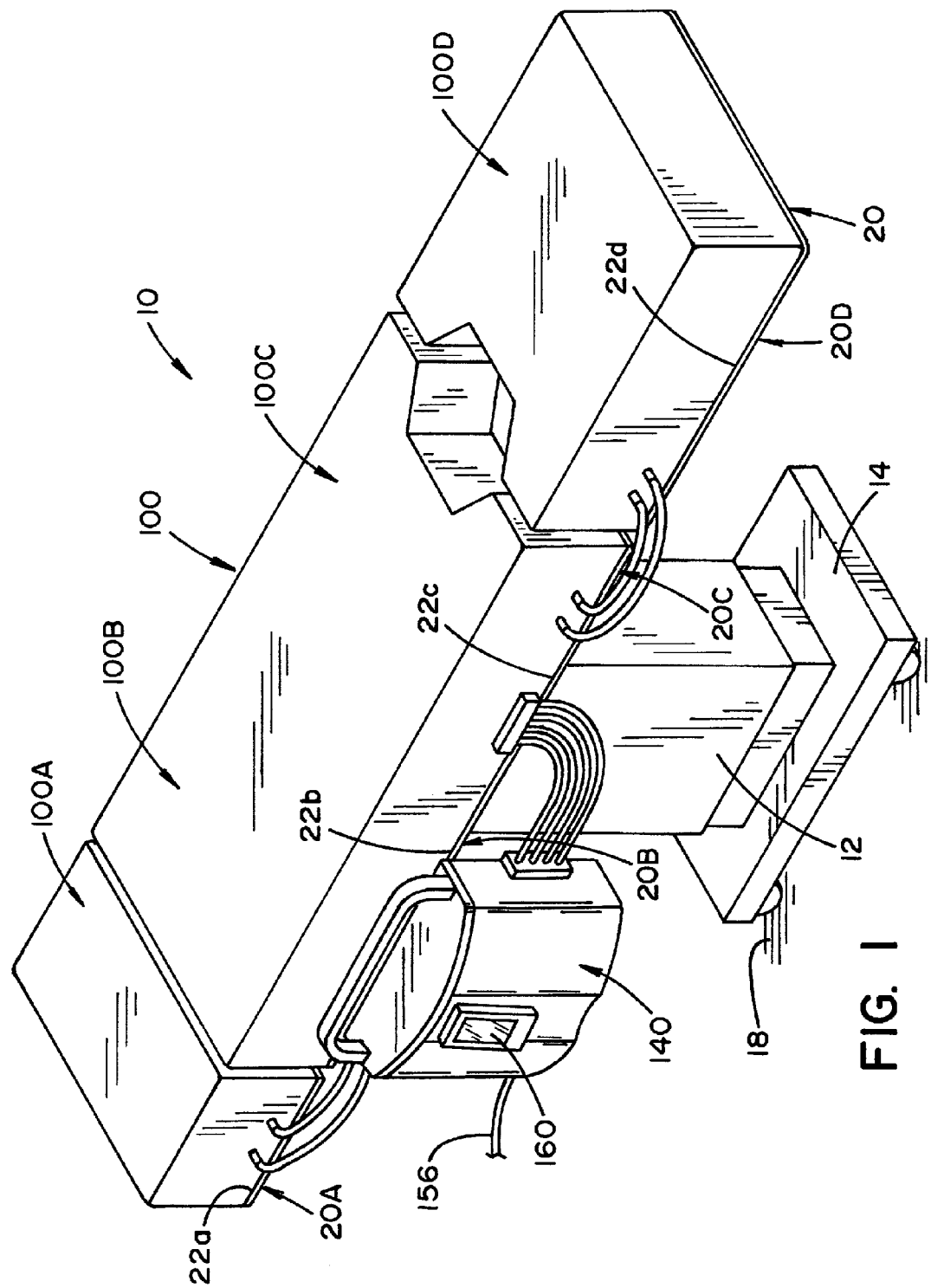
FIG. 1 is a perspective view of a support structure having a pressurized mattress system disposed thereon.

Referring now to the drawings wherein the showings are for the purpose of illustrating a preferred embodiment of the invention only and not for the purpose of limiting the same, FIG. 1 shows a support structure 10 (e.g., an operating room table, a patient bed, etc.) illustrating a preferred embodiment of the present invention. Support structure 10 includes a pressurized mattress system 100 that is mounted on a patient support 20. Patient support 20 is mounted to a support column 12 that extends upward from a base 14. Support column 12 and base 14 are conventionally known and, therefore, shall not be described in great detail. Support column 12 is a telescoping structure that allows for vertical adjustment of patient support 20. Base 14 includes wheels 16 for allowing support structure 10 to be moved along a floor 18. It is also contemplated that support structure 10 may be permanently fixed to floor 18.

In the embodiment shown, patient support 20 is comprised of a head section 20A, a scapula (upper torso) section 20B, a sacrum (seat and thighs) section 20C and a leg section 20D. Sections 20A, 20B, 20C, 20D are moveable relative to each other so that a user may vary the position of a patient laying on support structure 10. Each section 20A, 20B, 20C, 20D has an upper surface 22a, 22b, 22c, 22d, respectively.

Pressurized mattress system 100 includes four (4) zones or sections, namely, a head zone 100A, a scapula zone 100B, a sacrum zone 100C and a leg zone 100D, a control unit assembly 140 and a handheld control unit 160. Head zone 100A, scapula zone 100B, sacrum zone 100C and leg zone 100D of pressurized mattress system 100 are respectively disposed on sections 20A, 20B, 20C, 20D of patient support 20. The aforementioned zones 100A, 100B, 100C, 100D of pressurized mattress system 100 are similar and only head zone 100A will be described in detail.

Figure 2:
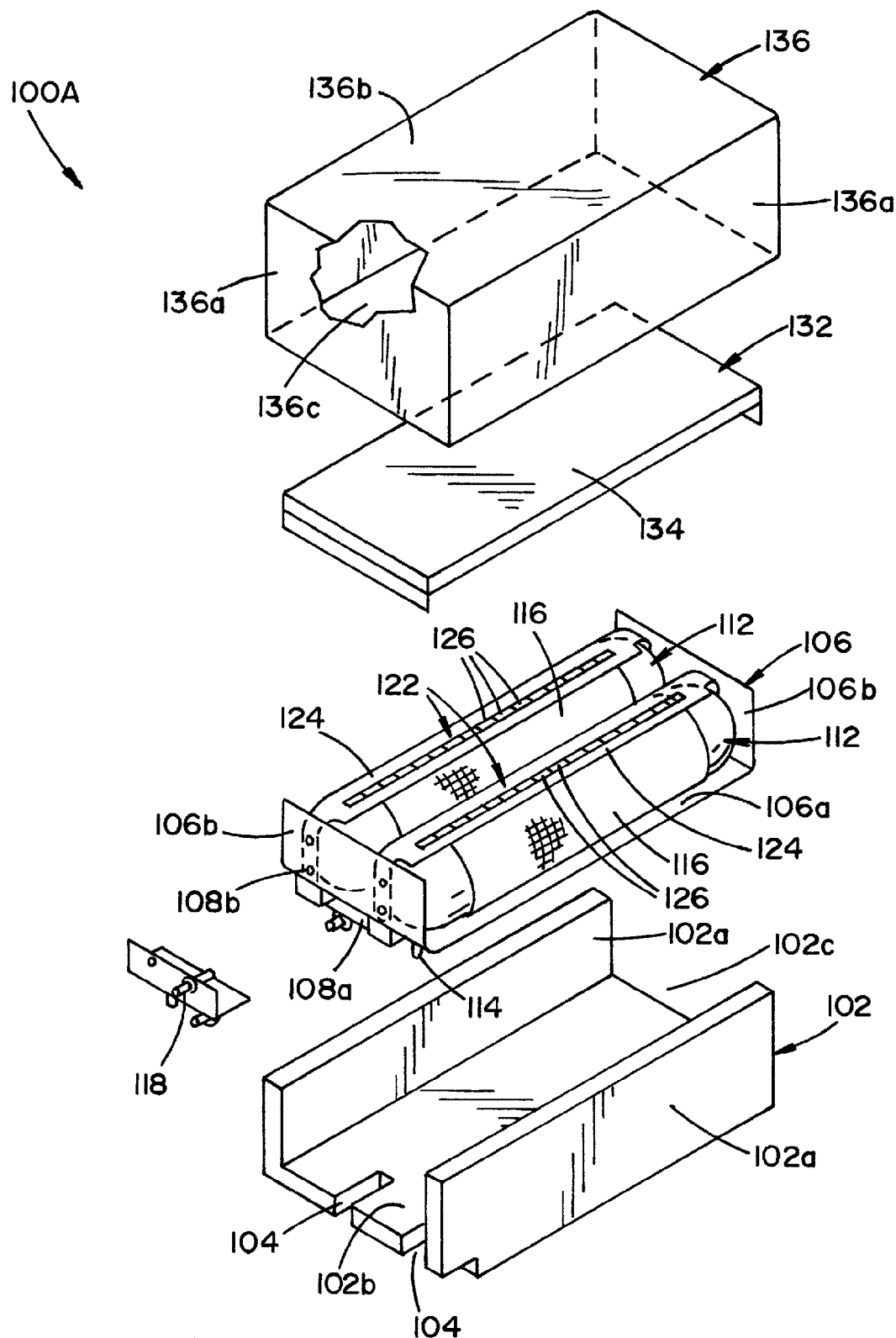
FIG. 2 is an exploded view of a head zone of the pressurized mattress system of FIG. 1.

Head zone 100A supports a head of a patient. Referring now to FIG. 2, head zone 100A is best seen. Head zone 100A generally includes a foam substrate 102, a plurality of inflatable air bladders 112, an interface pressure sensor assembly 122, a heating pad assembly 132 and a cover 136.

Foam substrate 102 is disposed on upper surface 22a of head section 20A. In general, foam substrate 102 is an elongated U-shape structure having side walls 102a and a bottom wall 102b. Notches or openings 104 are formed in bottom wall 102b for allowing hoses and cables (not shown) to pass therethrough. Side walls 102a and bottom wall 102b define a cavity 102c for receiving a support fabric 106 and the plurality of inflatable air bladders 112. Foam substrate 102 is made from urethane foam.

Support fabric 106 is disposed on foam substrate 102. In general, support fabric 106 is formed to have a bottom 106a and sides 106b extending upward from bottom 106a. Notches 108a and holes 108b are formed in sides 106b of support fabric 106 for allowing hoses and cables (not shown) to pass therethrough..

The plurality of inflatable air bladders 112 is disposed on an upper surface of bottom wall 106a of support fabric 106. Each inflatable air bladder 112 is made of an elastomeric material that allows each inflatable air bladder 112 to increase in size when supplied with a pressurized fluid, e.g., air. In the embodiment shown, each inflatable air bladder 112 is generally cylindrical in shape with an inlet port 114 disposed at one end thereof. A tubular sleeve 116 is disposed around each inflatable bladder 112 for limiting the expansion thereof. A pressure sensor 118 is fluidly connected to the plurality of inflatable bladders 112 of head zone 100A for providing a signal indicative of a "zone air pressure (ZAP)" for head zone 100A. All of the inflatable air bladders 112 for head zone 100A are fluidly connected together such that all the inflatable air bladders 112 are maintained at the same zone air pressure. In this regard, pressure sensor 118 provides a single value for the zone air pressure (ZAP) for head zone 100A.

In the embodiment shown, head zone 100A of mattress system 100 includes two (2) inflatable air bladders 112. In one example embodiment, each zone 100A, 100B, 100C, 100D includes four (4) to ten (10) inflatable air bladders. However, it is contemplated that the foregoing zones 100A, 100B, 100C, 100D may include any number of inflatable air bladders 112 based on the dimensions of support structure 10.

Interface pressure sensor assembly 122 is disposed on an upper external surface of each inflatable air bladder 112. Interface pressure sensor assembly 122 includes a mounting strip 124 and a plurality of interface pressure sensors 126 mounted thereon. Each interface pressure sensor 126 provides a signal indicative of the pressure applied thereto. In the embodiment shown, each interface pressure sensor assembly 122 includes sixteen (16) interface pressure sensors 126. As such, in the embodiment shown, head zone 100A includes thirty-two (32) interface pressure sensors 126. In one example embodiment, each zone 100A, 100B, 100C, 100D may have sixteen (16) to eighty (80) interface pressure sensors 126, depending on the dimensions of support structure 10 and the desired accuracy of pressurized mattress system 100.

Heating pad assembly 132 is disposed above interface pressure sensor assembly 122. Heating pad assembly 132 includes a generally rectangular-shaped substrate 134, a plurality of heating elements (not shown) and a plurality of temperature sensors (not shown). The heating elements and the temperature sensors are embedded within substrate 134. The heating elements are electrical devices that heat substrate 134 when the heating elements are supplied with an electric current. The temperature sensors provide signals indicative of the temperature of substrate 134 at a plurality of discrete locations on substrate 134.

Cover 136 is disposed above heating pad assembly 132. Cover 136 is generally rectangular-in-shape with side walls 136a and a top wall 136b. Side walls 136a and top wall 136b define a cavity 136c. Cover 136 is made from a flexible material and is dimensioned to fit securely over heating pad assembly 132, the plurality of inflatable air bladders 112 and foam substrate 102.

Figure 3:
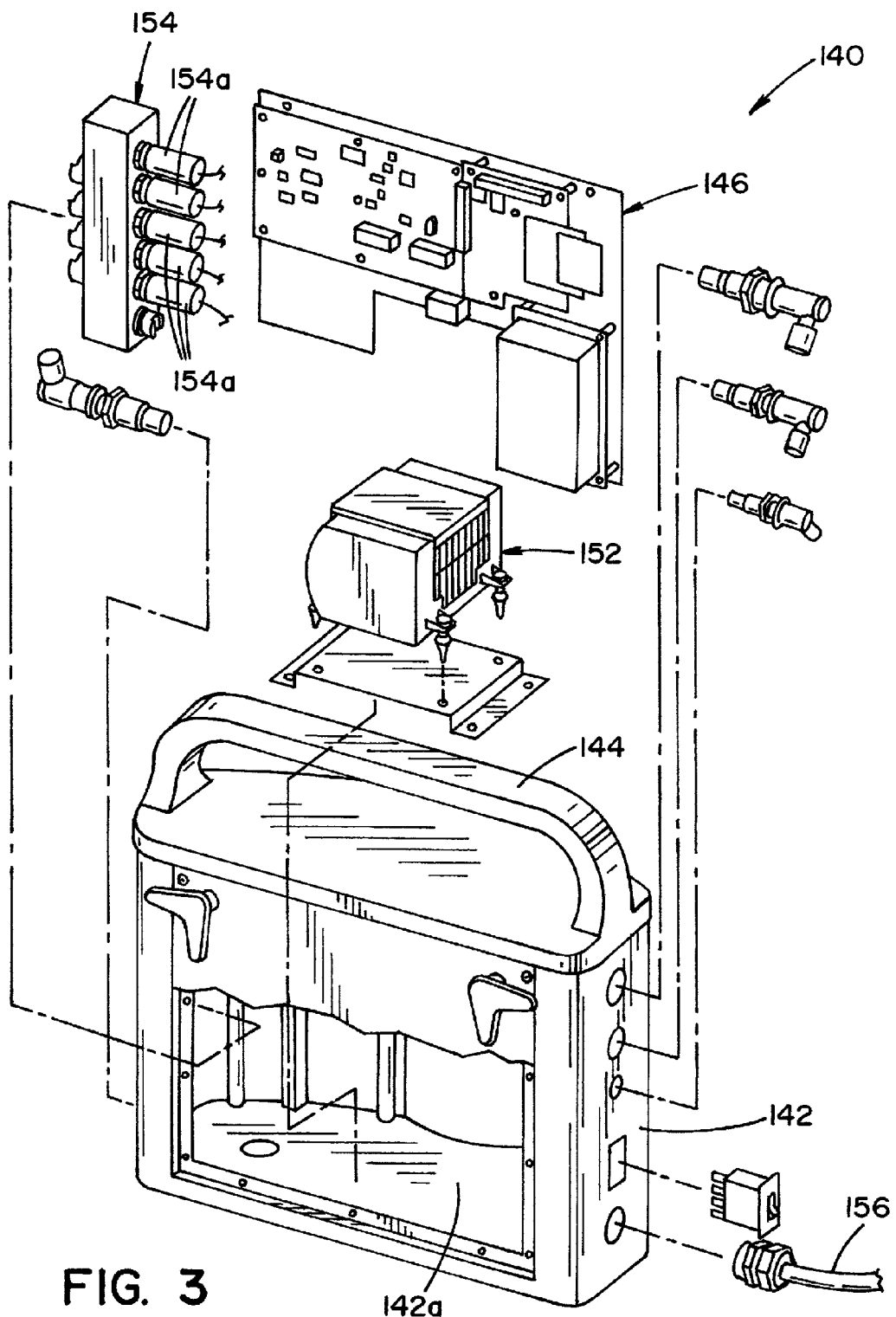
FIG. 3 is an exploded view of a control unit of the pressurized mattress system of FIG. 1.

Referring now to FIG. 3, control unit assembly 140 is best seen. In general, control unit assembly 140 includes a housing 142, a controller 146, an air compressor 152 and an air manifold assembly 154. A power cable 156 connects control unit assembly 140 to a wall outlet (not shown).

Housing 142 defines an internal cavity 142a for holding various electrical components within control unit assembly 140. An upper portion of housing 142 is formed to define a handle 144 for allowing a user to easily carry control unit assembly 140. Housing 142 includes a mounting bracket (not shown) for attaching housing 142 to support structure 10.

Controller 146 is disposed within internal cavity 142a of housing 142. In general, controller 146 is a computer that is programmed to control the operation of pressurized mattress system 100. Controller 146 includes inputs for receiving signals from the plurality of interface pressure sensors 126, pressure sensor 118 and the temperature sensors in heating pad assembly 132. Controller 146 includes outputs for controlling the operation of various components of pressurized mattress system 100, as described in detail below.

It is also contemplated that controller 146 may optionally be connected to other accessories, e.g., a heating blanket (not shown), so that controller 146 may control the operation of these accessories. For example, a heating blanket may be disposed over the patient to provide additional heat to the patient. Similar to heating pad assembly 132, the heating blanket may include heating elements and a plurality of temperature sensors embedded therein. The heating elements and the plurality of temperature sensors may be connected to controller 146 so that controller 146 may monitor and control the operation of the heating blanket.

Air compressor 152 is connected to and controlled by controller 146. Air compressor 152 provides pressurized air to air manifold 154. In the embodiment shown, air compressor 152 is disposed within internal cavity 142a of housing 142. It is contemplated that air compressor 152 may be disposed outside of internal cavity 142a of housing 142.

Air manifold assembly 154 includes a plurality of control valves 154a. Control valves 154a control the flow of pressurized air from air compressor 152 to the plurality of inflatable air bladders 112 and the flow of pressurized air from the plurality of inflatable air bladders 112 to the surrounding environment. Control valves 154a are connected to controller 146 such that controller 146 controls the operation of control valves 154a. Control valves 154a may take the form of solenoid valves.

Figure 4:
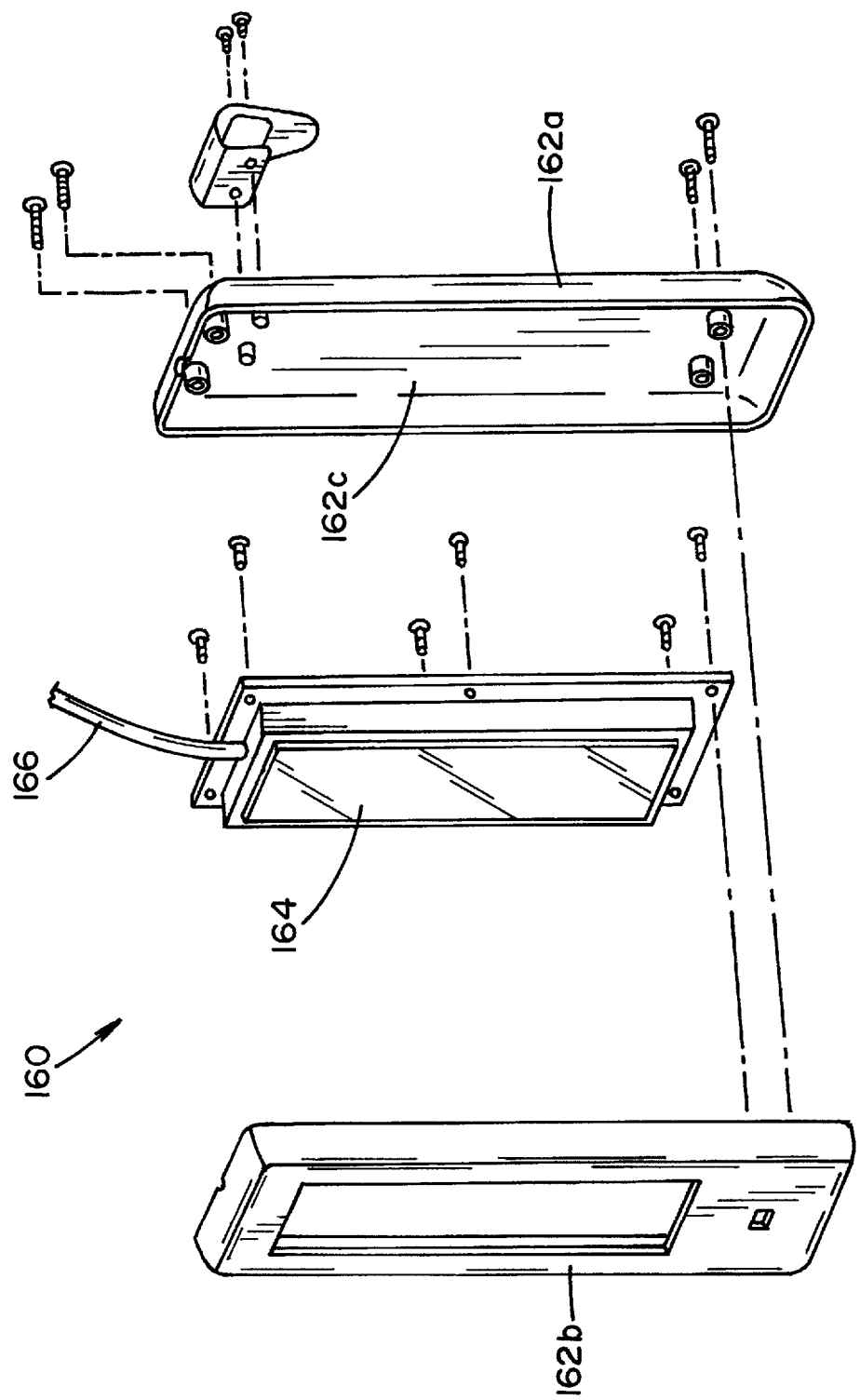
FIG. 4 is an exploded view of a handheld control unit of the pressurized mattress system of FIG. 1.

Pressurized mattress system 100 includes a handheld control unit 160, best seen in FIG. 4 that allows a user to control pressurized mattress system 100. Handheld control unit 160 includes a lower housing 162a and an upper housing 162b. Lower housing 162a and upper housing 162b define a cavity 162c for receiving a display unit 164. Display unit 164 is an input/output device that provides feedback to the user regarding the status of pressurized mattress system 100 and allows the user to input commands into controller 146 to control the operation of pressurized mattress system 100. Handheld control unit 160 is connected to control unit assembly 140 by a communications cable 166. In this respect, handheld control unit 160 allows a user to move about a room while still controlling the operation of pressurized mattress system 100.

The operation of pressurized mattress system 100 will now be described with reference to FIGS. 1-5. As noted above, controller 146 of pressurized mattress system 100 is programmed to control the operation of pressurized mattress system 100. In particular, controller 146 is programmed to control pressurized mattress system 100 in several "modes" of operation, namely, an "Auto Adjust Mode," a "Custom Mode," a "Transfer Mode," a "CPR Mode" and a "Temperature Control Mode." While in the foregoing modes, display unit 164 shows a contour mapping of the zone interface pressure (ZIP) and/or temperature at discrete locations in each zone. The foregoing contour mappings allow a user to see the distribution of interface pressures and temperatures for each zone and to verify that pressurized mattress system 100 is functioning properly.

Auto Adjust Mode

Figure 5:
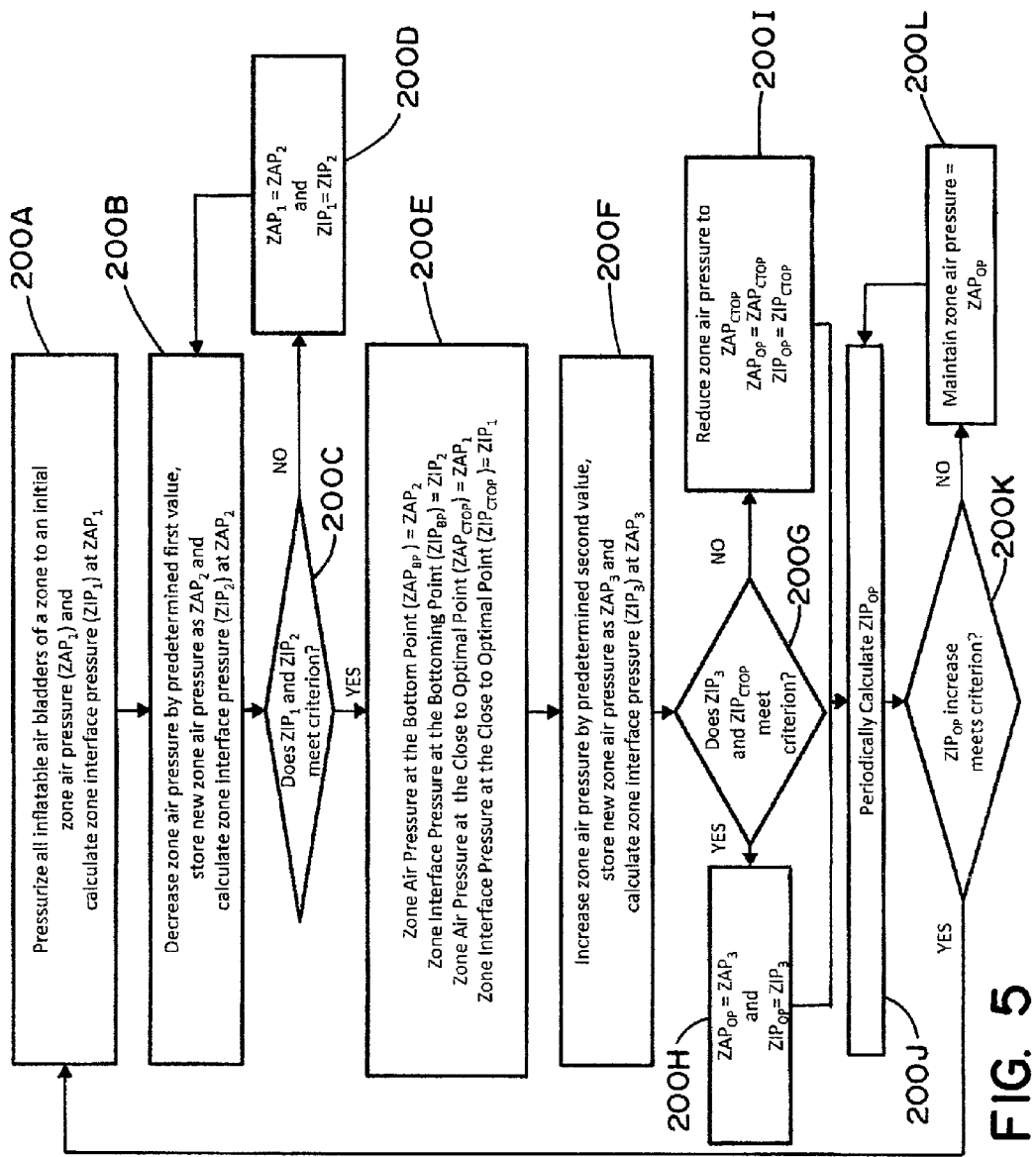
FIG. 5 is a flow chart illustrating the steps in the operation of the pressurized mattress system of FIG. 1 during an Auto Adjust Mode.

When pressurized mattress system 100 is in the "Auto Adjust Mode," controller 146 controls the components of pressurized mattress system 100 to automatically vary the zone air pressure within the plurality of inflatable air bladders 112 based on the interface pressures measured by the plurality of interface pressure sensors 126. In particular, controller 146 implements a control algorithm to separately adjust the zone air pressure of each zone 100A, 100B, 100C, 100D in order to redistribute or minimize high interface pressure points between a patient and the plurality of inflatable air bladders 112. FIG. 5 is a flow chart identifying the steps of the "Auto Adjust Mode."

The Auto Adjust Mode of pressurized mattress system 100 is designed to determine an "optimal point (OP)" or "optimal zone air pressure (OZAP)." The term "optimal point" refers to the condition wherein the zone air pressures in zones 100A, 100B, 100C, 100D are low enough that pressurized mattress system 100 is soft for a patient laying thereon, but not so low that more than a predetermined percentage or portion of the patient is directly supported by substrate 102 disposed below the plurality of inflatable air bladders 112. The zone air pressure at which the predetermined percentage or portion of the patient contacts substrate 102 is referred to as a "bottoming point (BP)." In general, the Auto Adjust Mode first determines the "bottoming point" and then determines the "optimal point" based on the determined "bottoming point." The following is a detailed description of the steps of the Auto Adjust Mode of pressurized mattress system 100.

After a patient has been placed on support structure 10, a user initiates the Auto Adjust Mode. Once pressurized mattress system 100 is in the Auto Adjust Mode, a user does not need to input data or commands into controller 146. During the Auto Adjust Mode, controller 146 energizes air compressor 152, as needed, to maintain a desired air pressure for operation of pressurized mattress system 100. The present invention will be described hereinafter with reference to controlling the zone air pressure in head zone 100A, but applies equally to the remaining zones 100B, 100C, 100D of pressurized mattress system 100.

Referring now to Step 200A in FIG. 5, controller 146 energizes control valves 154a to cause head zone 100A to be inflated to an initial zone air pressure ($ZAP_1$). In one example embodiment, the initial zone air pressure is approximately 30 mmHg. Once the zone air pressure for head zone 100A has stabilized, controller calculates a "zone interface pressure ($ZIP_1$)" at $ZAP_1$.

The term "zone interface pressure (ZIP)" is used hereinafter to refer to a value that controller 146 calculates based on the interface pressures (IP) measured by the plurality of interface pressure sensors 126 of head zone 100A. In one example embodiment, controller 146 uses only a predetermined number of the measured interface pressures (IP). For example, controller 146 may use only the highest 25% of the measured interface pressures (IP) at a given ZAP. In yet another example embodiment, controller 146 averages a predetermined number of the measured interface pressures (IP) for head zone 100A to calculate a ZIP for a given ZAP.

Referring now to STEP 200B, after $ZAP_1$ stabilizes and controller 146 calculates $ZIP_1$, controller 146 causes the zone air pressure for head zone 100A to be reduced by a predetermined first value. In one example embodiment, the zone air pressure is decreased by approximately 2.5 mmHg. The new zone air pressure is stored as $ZAP_2$. Controller 146 then calculates $ZIP_2$ at $ZAP_2$. $ZIP_2$ is calculated in the same manner described above for $ZIP_1$. In particular, controller 14 uses the measured interface pressures (IP) at $ZAP_2$ to calculate $ZIP_2$.

Referring now to STEP 200C, controller 146 compares $ZIP_1$ to $ZIP_2$. If the comparison of $ZIP_1$ to $ZIP_2$ meets a predetermined criterion, controller 146 proceeds to STEP 200E. If the comparison of $ZIP_1$ to $ZIP_2$ does not meet the predetermined criterion, then controller proceeds to STEP 200D. In one example embodiment, the criterion use in STEP 200C is that $ZIP_2$ is greater than $ZIP_1$ by a predetermined value. For example, the predetermined criterion may be that $ZIP_2$ is at least 10% greater than $ZIP_1$.

Referring now to STEP 200D, if the comparison of $ZIP_1$ to $ZIP_2$ does not meet the predetermined criterion in STEP 200C, controller 146 stores the value of $ZAP_2$ as $ZAP_1$ and the value of $ZIP_2$ as $ZIP_1$. Controller 146 then repeats STEP 200B. As noted above, during STEP 200B, controller 146 reduces the zone air pressure for head zone 100A by a predetermined value and calculates $ZIP_2$. Controller 146 then proceeds to STEP 200C and compares $ZIP_1$ to $ZIP_2$, as described in detail above.

STEPS 200B, 200C, 200D basically are a "loop" wherein the zone air pressure for head zone 100A decreases in predetermined increments of pressure. As the zone air pressure decreases, the patient begins to "sink" into the plurality of inflatable air bladders 112 of head zone 100A. As the patient "sinks" into the plurality of inflatable air bladders 112, portions of the patient begin to be directly supported by foam substrate 102 disposed below the plurality of inflatable air bladders 112. The interface pressures associated with the portions of the patient that are directly support by foam substrate 102 begin to increase due to foam substrate 102 being stiffer than the plurality of inflatable air bladders 112. Because the zone interface pressure (ZIP) at each zone air pressure is calculated based on the measured interface pressures (IP), the calculated zone interface pressure also will increase with the increase in the measured interface pressures (IP).

When controller 146 determines that $ZIP_1$ and $ZIP_2$ meet the predetermined criterion, controller 146 proceeds to STEP 200E. In STEP 200E, controller 146 sets a "Zone Air Pressure at the Bottoming Point ($ZAP_{BP}$)" equal to $ZAP_2$ and a "Zone Interface Pressure at the Bottoming Pont ($ZIP_{BP}$)" equal to $ZIP_2$. Controller 146 also sets a "Zone Air Pressure Close to the Optimal Point ($ZAP_{CTOP}$)" equal to $ZAP_1$ and a Zone Interface Pressure at Close to Optimal Point ($ZIP_{CTOP}$) equal to $ZIP_1$.

According to the present invention, STEPS 200B, 200C, 200D and 200E are designed to determine the aforementioned "bottoming point." As described above, the term "bottoming point" refers to the condition wherein the zone air pressure in the plurality of air bladders 112 of head zone 100A is low enough such that a portion of the patient is directly supported by substrate 102. The remaining steps of the Auto Adjust Mode are designed to compare the zone interface pressures (ZIP) at two (2) different zone air pressures (ZAP) and determine the zone air pressure that is closest to the "optimal point."

Referring now to STEP 200F, controller 146 causes control valves 154a to increase the zone air pressure of head zone 100A by a predetermined second value. The zone air pressure is stored as $ZAP_3$ and controller 146 then calculates a zone interface pressure ($ZIP_3$) at $ZAP_3$. In one example embodiment, the zone air pressure is increased by about 4 mmHg such that $ZAP_3$ is greater than $ZAP_{CTOP}$.

Referring now to STEP 200G, controller 146 compares $ZIP_3$ to $ZIP_{CTOP}$ to determine the zone air pressure that is closest to the optimal point. In particular, controller 146 determines whether the comparison of $ZIP_3$ to $ZIP_{CTOP}$ meets a predetermined criterion. In one example embodiment, the predetermined criterion is that $ZIP_3$ is less than or equal to $ZIP_{CTOP}$.

If the comparison of $ZIP_3$ to $ZIP_{CTOP}$ meets the predetermined criterion, controller 146 proceeds to STEP 200H. In STEP 200H, controller 146 sets a "Zone Air Pressure at the Optimal Point ($ZAP_{OP}$)" equal to $ZAP_3$ and a "Zone Interface Pressure at the Optimal Point ($ZIP_{OP}$)" equal to $ZIP_3$. In other words, controller 146 determines that $ZAP_3$ is closest to the optimal point.

If the comparison of $ZIP_3$ to $ZIP_{CTOP}$ in STEP 200G does not meet the predetermined criterion, then controller proceeds to STEP 200I. In STEP 200I, controller sets "Zone Air Pressure at the Optimal Point ($ZAP_{OP}$)" equal to $ZAP_{CTOP}$ and a "Zone Interface Pressure at the Optimal Point ($ZIP_{OP}$)" equal to $ZIP_{CTOP}$. In other words, controller 146 determines that $ZAP_{CTOP}$ is closest to the optimal point. Once $ZAP_{OP}$ is determined, controller 146 causes the zone air pressure for head zone 100A to be maintained at $ZAP_{OP}$.

Referring now to STEP 200J, controller 146 continues to periodically calculate the zone interface pressure (ZIP) for head zone 100A, while maintaining the zone air pressure at $ZAP_{OP}$. It is believed that the zone interface pressure for head zone 100A may change if the patient moves or shifts their position while laying on pressurized mattress system 100. If the zone interface pressure for head zone 100A increases by a predetermined value within a predetermined time, then controller 146 will increase the zone air pressure of head zone 100A to the initial zone air pressure and repeat the foregoing steps of the Auto Adjust Mode, starting with STEP 200A. The present invention, thus, provides a method to redistribute the interface pressures for head zone 100A. In other words, the present invention reduces the maximum interface pressure points to a lower value by redistributing the interface pressure to some lower interface pressure points. In one example embodiment, controller 146 monitors the zone interface pressure for an increase of about 15% or more within one (1) minute. The remaining zones 100B, 100C, 100D of pressurized mattress system 100 are independently controlled in the same manner described above for head zone 100A.

Custom Mode

The "Custom Mode" of pressurized mattress system 100 allows a user to manually set the zone air pressure within the plurality of inflatable air bladders 112 for zones 100A, 100B, 100C, 100D of mattress system 100. The user selects a zone(s) 100A, 100B, 100C, 100D and inputs a desired zone air pressure(s) into controller 146 using handheld control unit 160. Controller 146 then controls air compressor 152 and air manifold assembly 154 to obtain the desired zone air pressure(s) in selected zone(s) 100A, 100B, 100C, 100D of pressurized mattress system 100. Display unit 164 provides an indication to the user when the desired zone air pressure(s) have been obtained.

Transfer Mode

The "Transfer Mode" of pressurized mattress system 100 allows a user to set the zone air pressure within the plurality of inflatable air bladders 112 to aid in transferring a patient to/from support structure 10. The user inputs the appropriate command into controller 146 using handheld control unit 160. Controller 146 then controls air compressor 152 and air manifold assembly 154 to achieve the zone air pressure(s) in zones 100A, 100B, 100C, 100D of mattress system 100 that are predetermined to be optimal for aiding in transferring a patient to/from support structure 10. In one example embodiment, controller 146 causes the plurality of inflatable air bladders 112 to be inflated to a maximum air pressure. In one example embodiment, the maximum air pressure is about 50 mmHg. Display unit 164 provides an indication to the user when the optimal zone air pressure(s) have been obtained.

CPR Mode

The "CPR Mode" of pressurized mattress system 100 allows a user to set the pressure within the plurality of inflatable air bladders 112 to aid in administering cardiopulmonary resuscitation (CPR) to a patient laying on support structure 10. As commonly known by those skilled in the art, administering CPR while a patient is laying on a soft mattress tends to be challenging because the soft mattress makes it difficult to apply effective chest compressions to the patient. The present invention allows the user to select a "CPR Mode" wherein controller 146 controls the zone air pressure in the plurality of inflatable air bladders 112 to achieve a zone air pressure that is predetermined to be optimal for performing CPR (hereinafter referred to as "the optimal CPR air pressure"). In one example embodiment, the optimal CPR air pressure is a maximum air pressure that the plurality of inflatable air bladders 112 can withstand. In another example embodiment, controller 146 causes the plurality air bladders 112 to be deflated such that the patient rests on substrate 102. Substrate 102 is designed to provide enough support such that the user can apply effective chest compressions to the patient.

When a user wishes to perform CPR on a patient, the user inputs the appropriate command into controller 146 using handheld control unit 160. Controller 146 then controls air compressor 152 and air manifold assembly 154 to achieve the optimal CPR air pressure in zones 100A, 100B, 100C, 100D of pressurized mattress system 100 in less than about thirty (30) seconds. Display unit 164 provides an indication to the user when the optimal CPR air pressure has been reached.

Temperature Control Mode

The "Temperature Control Mode" of pressurized mattress system 100 allows a user to independently set the temperature of each zone of pressurized mattress system 100. In particular, the user selects a target temperature(s) for zone(s) 100A, 100B, 100C, 100D using handheld control unit 160. Once the target temperature(s) is selected, controller 146 energizes the appropriate heating element to cause the selected zone 100A, 100B, 100C, 100D to be heated. Controller 146 monitors the temperature sensors associated with selected zone 100A, 100B, 100C, 100D to determine when the target temperature has been reached. Once the target temperature has been obtained, controller 146 de-energizes the heating element. If the temperature of zone 100A, 100B, 100C, 100D falls below a preset limit, then controller 146 energizes the appropriate heating element thereby causing the temperature of the relevant zone(s) 100A, 100B, 100C, 100D to increase. The Temperature Control Mode of pressurized mattress system 100 is independent of the aforementioned "modes of operation" wherein controller 146 controls the zone air pressures in the plurality of inflatable air bladders 112.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A method for controlling a pressurized mattress system, said pressurized mattress system having an upper surface for receiving a patient thereon, said pressurized mattress system including:
   at least one zone having at least one inflatable air bladder,
   a substrate disposed below said at least one inflatable air bladder,
   a pressure sensor for measuring a zone air pressure of said at least one zone,
   a plurality of interface pressure sensors disposed on an upper surface of said at least one inflatable air bladder, each of said plurality of interface pressure sensors measuring an interface pressure at a discrete location along said upper surface of said at least one inflatable air bladder,
   a source of pressurized air, and
   a controller for receiving signals from said pressure sensor and said plurality of interface pressure sensors and for controlling the flow of pressurized air to/from said at least one inflatable air bladder based on said signals, wherein said controller calculates a zone interface pressure for said at least one zone based on said signals from said plurality of interface pressure sensors,
   said method comprising the steps of:
     a) inflating said at least one inflatable air bladder to an initial zone air pressure;
     b) reducing the zone air pressure by a predetermined first value and calculating a zone interface pressure;
     c) repeating step b) until the zone interface pressure meets a predetermined criterion and storing said zone air pressure as a bottoming point zone air pressure; and
     d) pressurizing the at least one zone to an optimal zone air pressure based on said bottoming point zone air pressure
   wherein said step d) of pressurizing the at least one zone to an optimal zone air pressure includes the steps of:
     1) calculating an associated zone interface pressure when said bottoming point zone air pressure is increased by said predetermined first value;

2) calculating an associated zone interface pressure when said bottoming point zone air pressure is increased by said predetermined second value; and 3) inflating said at least one zone to the zone air pressure associated with the lower zone interface pressure from steps 1 and 2.

2. The method as defined in claim 1, wherein said predetermined first value is about 2.5 mmHg and said predetermined second value is about 4.0 mmHg.

3. A method for controlling a pressurized mattress system, said pressurized mattress system having an upper surface for receiving a patient thereon, said pressurized mattress system including:
   at least one zone having at least one inflatable air bladder,
   a pressure sensor for measuring a zone air pressure of said at least one zone,
   a plurality of interface pressure sensors disposed on an upper surface of said at least one inflatable air bladder, each of said plurality of interface pressure sensors measuring an interface pressure at a discrete location along said upper surface of said at least one inflatable air bladder,
   a source of pressurized air, and
   a controller for receiving signals from said pressure sensor and said plurality of interface pressure sensors and for controlling the flow of pressurized air to/from said at least one inflatable air bladder based on said signals, wherein said controller calculates a zone interface pressure for said at least one zone based on said signals from said plurality of interface pressure sensors,
said method comprising the steps of:
   a) inflating said at least one inflatable air bladder to an initial zone air pressure;
   b) calculating a zone interface pressure and storing as a first zone interface pressure;
   c) reducing the zone air pressure by a predetermined first value;
   d) calculating a zone interface pressure and storing as a second zone interface pressure;
   e) repeating steps b)-d) until the second zone interface pressure exceeds the first zone interface pressure by a predetermined amount;
   f) storing said second zone air pressure as a zone air pressure at a bottoming point;
   g) increasing the zone air pressure by a predetermined second value;
   h) calculating a zone interface pressure and storing as a third zone interface pressure; and
   i) comparing said third zone interface pressure to said first zone interface pressure and inflating said at least one zone to the zone air pressure associated with the lower zone interface pressure.

4. The method as defined in claim 3, further comprising the step of:
   j) continuously calculating a new zone interface pressure at predetermined increments of time and repeating said method starting at step a), if said calculated zone interface pressure increases by more than a predetermined third value.

5. The method as defined in claim 4, wherein said predetermined third value in step j) is 15% of a previously calculated zone interface pressure.

6. The method as defined in claim 3, wherein said initial zone air pressure is about 30 mmHg.

7. The method as defined in claim 3, wherein said predetermined first value is 2.5 mmHg.

8. The method as defined in claim 3, wherein said predetermined amount in step e) is 10% of said first zone interface pressure.

9. The method as defined in claim 3, wherein said predetermined second value is 4 mmHg.

10. The method as defined in claim 3, wherein said controller calculates said zone interface pressure by averaging a predetermined number of interface pressures measured by said plurality of interface pressure sensors.

11. The method as defined in claim 10, wherein said predetermined number of interface pressures is the average of the highest 25% of the interface pressures measured by said plurality of interface pressure sensors.

12. The method as defined in claim 3, wherein said pressurized mattress system includes a head zone, a scapula zone, a sacrum zone and a leg zone.

13. The method as defined in claim 12, wherein said controller is programmed to adjust the zone air pressure of each of said zones independently.

14. The method as defined in claim 3, wherein said pressurized mattress system includes only a mid-section zone for supporting a torso of a patient.

* * * * *